United States Patent [19]

Archambault et al.

[11] 3,927,191
[45] Dec. 16, 1975

[54] PROCESS FOR RECOVERY OF SULPHUR FROM SULPHUR DIOXIDE

[75] Inventors: Jacques Olivier Archambault; John Douglas McIrvine, both of Mont-Saint-Hilaire, Canada

[73] Assignee: Canadian Industries Limited, Montreal, Canada

[22] Filed: Jan. 21, 1971

[21] Appl. No.: 108,281

[30] Foreign Application Priority Data
Feb. 11, 1970   Canada .................................. 074603

[52] U.S. Cl. .................................. 423/570; 23/226
[51] Int. Cl.² .......................................... C01B 17/04
[58] Field of Search ........................ 23/226; 423/570

[56] References Cited
UNITED STATES PATENTS

| | | | |
|---|---|---|---|
| 1,967,263 | 7/1934 | Rosenstein ............................ | 23/226 |
| 3,199,955 | 8/1965 | West et al. ............................ | 23/226 |
| 3,495,941 | 2/1970 | Van Helden .......................... | 23/226 |

FOREIGN PATENTS OR APPLICATIONS

| | | | |
|---|---|---|---|
| 596,613 | 4/1960 | Canada .................................. | 23/226 |

Primary Examiner—G. O. Peters
Attorney, Agent, or Firm—Cushman, Darby & Cushman

[57] ABSTRACT

Elemental sulphur is recovered from sulphur dioxide by reduction with a hydrocarbon such as natural gas in a three stage process. The sulphur dioxide and hydrocarbon are employed in a 2:1 ratio of S:C with 50 to 60 percent of the sulphur dioxide being reacted with the hydrocarbon in the first stage and the remainder being introduced into the second stage reactor. The use of the lower ratio of sulphur dioxide to hydrocarbon in the first stage reduces the heat of reaction permitting the use of higher gas space velocities and resulting smaller size reactor.

4 Claims, 1 Drawing Figure

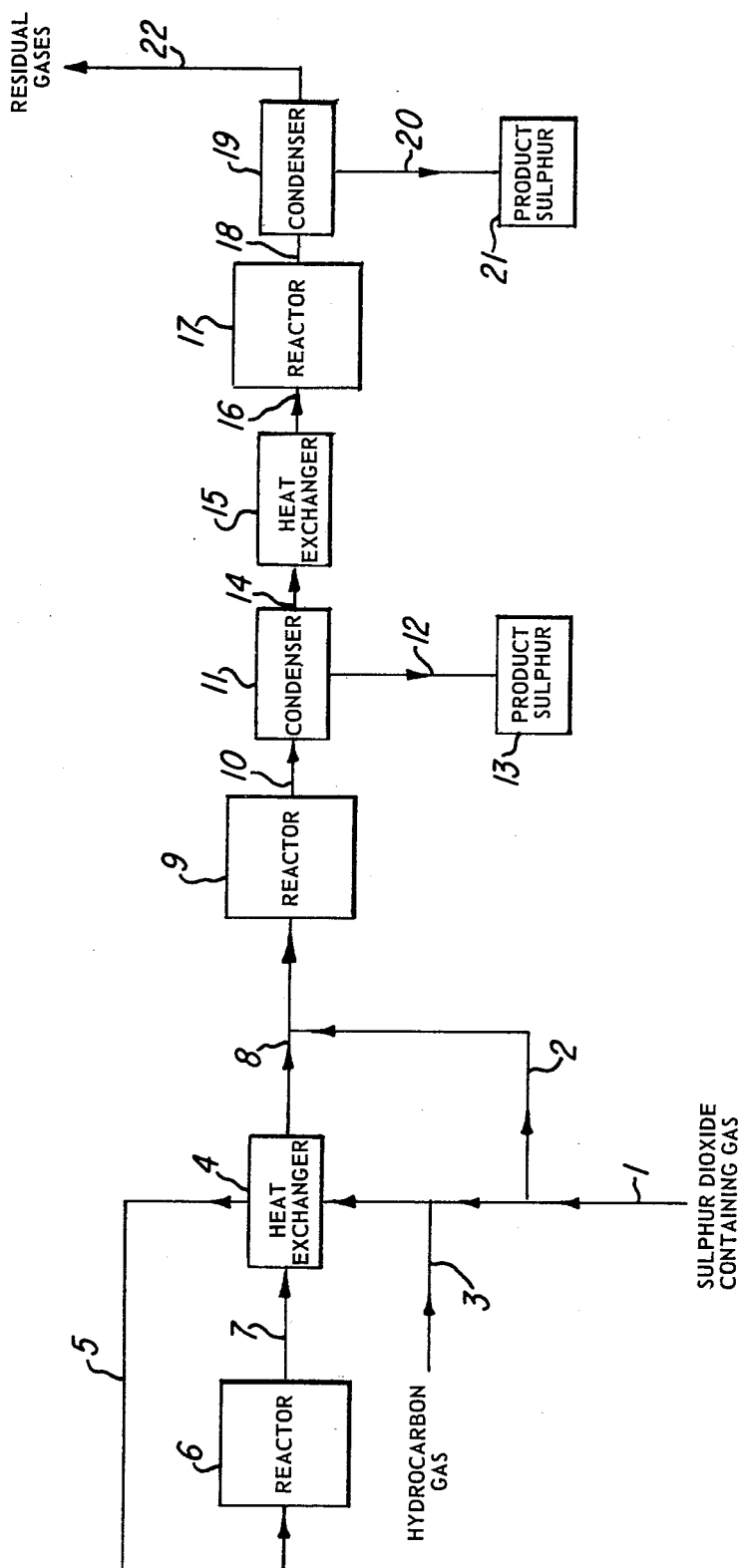

PROCESS FOR RECOVERY OF SULPHUR FROM SULPHUR DIOXIDE

This invention relates to a process for recovering elemental sulphur from sulphur dioxide-containing gases.

Sulphur dioxide is a by-product from the smelting of sulphide ores and from the burning of sulphide-containing coal. Since the sulphur dioxide-containing gas is a source of pollution if vented to the atmosphere, it is necessary to remove sulphur dioxide from by-product gases. Recovery of elemental sulphur from the by-producct sulphur dioxide serves the twofold purposes of removing a pollutant and at the same time producing a commercially valuable product. Processes for reducing sulphur dioxide to elemental sulphur using hot carbon, natural gas and hydrogen sulphide are known. multiple stage processes have been devised in which a first stage reaction of natural gas with sulphur dioxide to form sulphides such as hydrogen sulphide is followed by one or more additional stages at lower temperatures during which unreacted sulphur dioxide reacts with the sulphide products of the first stage to form elemental sulphur. It is also known, as disclosed in U.S. Pat. No. 1,967,263 to Ludwig Rosenstein dated July 24, 1934, to control the proportions of sulphur dioxide and natural gas reactants in a first stage so as to produce carbon dioxide, hydrogen sulphide and water, and in the second stage to react said hydrogen sulphide with another portion of sulphur dioxide. The reactions of the two stages are defined bythe two equations $$4SO_2 + 3CH_4 = 3CO_2 + 4H_2S \quad 2H_2O$$

$$2H_2S + SO_2 = 2H_2O + 3S$$

It can be seen that in the Rosenstein process a third of the sulphur dioxide bypass the first stage.

It has now been found that from 40 to 50 percent of the sulphur dioxide can be made to bypass the first stage of a multiple stage process for reducing sulphur dioxide to elemental sulphur having first stage catalytic reduction with a gaseous hydrocarbon such as natural gas. There is a resultant economic advantage in restricting the proportion of the sulphur dioxide reactant passing into the first stage reactor. The heat of reaction of sulphur dioxide and hydrocarbon drops sharply when the mole ratio of sulphur dioxide to hydrocarbon decreases below about 1.4 (i.e., a 30 percent sulphur dioxide bypass). When the reaction between sulphur dioxide and methane is examined it is found that the heat of reaction per mole is 6.4 Kcal at a $SO_2:CH_4$ mole ratio of 2.0, 6.5 Kcal at a mole ratio of 1.33 and only 1.2 Kcal at a mole ratio of 1.0. This lower rate of heat generation permits the use of higher gas space velocities without shortening the life of the catalyst. In turn, the use of higher gas space velocities results in a reduction in the size of the first stage reactor. The high temperature first stage reactor is costly to build and maintain and reduction in its size lowers the cost of the process. In addition, since the first stage operates at a higher temperature than the second stage the bypassing of sulphur dioxide reduces the amount of this gas that must be heated to the first stage reaction temperature and then cooled before entering the second stage reactor. Also, the operation of the sulphur dioxide reduction process with 40 percent to 50 percent of the sulphur dioxide bypassing the first stage provides a means for controlling the temperature of the first stage reactor. As noted above, the heat of reaction of sulphur dioxide with hydrocarbon drops sharply as the sulphur dioxide/hydrocarbon mole ratio falls below 1.4, corresponding to a 30 percent sulphur dioxide bypass. Thus by adjusting the mole ratio of sulphur dioxide to hydrocarbon in the range 1.2 to 1.0 (40 percent to 50 percent of sulphur dioxide) an effective means of controlling the first stage reactor temperature is provided.

It is thus a primary object of the present invention to improve the operating efficiency of a process for recovering elemental sulphur from sulphur dioxide. Additional objects will appear hereinafter.

The process for reducing sulphur dioxide to elemental sulphur comprises the steps of:

1. reacting a first portion of sulphur dioxide with a hydrocarbon in mole ratio of sulphur dioxide to hydrocarbon calculated as methane in the range 1.0 to 1.2 at a temperature in the range 800°C. to 1000°C. in the presence of a catalyst selected from the group consisting of activated alumina, bauxite, calcium sulphide and quartz to produce a gaseous mixture comprising sulphur dioxide, hydrogen sulphide, carbonyl sulphide and carbon disulphide;
2. cooling said gases and mixing the cooled gases with a second portion of sulphur dioxide in amount sufficient with addition of the portion of step 1) to provide a total mole ratio of sulphur dioxide to hydrocarbon calculated as methane of 2.0;
3. contacting said mixture of gases with a catalyst maintained at a temperature in the range 350°C. to 450°C. to thereby react the carbonyl sulphide and carbon disulphide with sulphur dioxide to produce elemental sulphur;
4. cooling the reaction mixture to condense the elemental sulphur and separating said sulphur to leave a gaseous mixture containing hydrogen sulphide and sulphur dioxide in approximately a 2:1 molar ratio;
5. heating said gaseous mixture of hydrogen sulphide and sulphur dioxide in the presence of a catalyst at a temperature in the range 200°C. to 275°C. to form additional elemental sulphur; and
6. cooling said additional elemental sulphur to condense and separate the same.

The hydrocarbon reactant may be natural gas, methane, ethane, propane, butane, pentane, hexane, etc., or mixtures of said hydrocarbons.

The catalyst employed in the three stages of the process may be selected from a large group of catalysts including activated alumina, bauxite, calcium sulphide and quartz.

The overall reaction of the three stage process can be represented by the equation $$CH_4 + 2SO_2 = S_2 + 2H_2O + CO_2$$

in the case when the hydrocarbon is methane. In the first stage of the process the reactants are sulphur dioxide and hydrocarbon in mole ratios in the range 1.0 to 1.2. An additional amount of sulphur dioxide sufficient to bring the total mole ratio of sulphur dioxide to hydrocarbon to the value of 2.0 is mixed with the gaseous products of the first stage reaction prior to the second stage reaction.

The process of the invention is illustrated in the accompanying drawing which shows diagrammatically equipment for carrying out the process.

Referring to the drawing a sulphur dioxide-containing gas is introduced through line 1 which has a branch line 2 which bypasses the first reactor. Hydrocarbon gas is introduced through line 3 which is connected to line 1 down stream from the connection to line 2. Means are provided for controlling the flow of the gases. The mixture of sulphur dioxide and hydrocarbon gas next passes through heat exchanger 4 where it is heated by the reaction products leaving the first stage reactor. The heated mixture of gases passes from the heat exchanger by line 5 to first stage reactor 6. This reactor contains one of the catalysts mentioned above and its temperature is maintained in the range 800°C. to 1000°C. In the first stage reactor sulphur dioxide is reduced to hydrogen sulphide, carbonyl sulphide and carbon disulphide. The reaction products pass from the first stage reactor by line 7 to heat exchanger 4 where they are cooled by incoming gases. The cooled gases next pass by line 8 to second stage reactor 9. Before entering reactor 9 the cooled gases are mixed with additional sulphur dioxide-containing gas carried by line 2, the amount of sulphur dioxide being such as to provide a total sulphur dioxide/hydrocarbon mole ratio of 2.0. Reactor 9 contains one of the catalysts mentioned above maintained at a temperature in the range 350°C. to 450°C. In reactor 9 the carbonyl sulphide and carbon disulphide react with additional sulphur dioxide to form elemental sulphur which at the temperature of the reactor is in gaseous form. The reaction products of the second stage reactor next pass by line 10 to condenser 11 where elemental sulphur is condensed out and passes by line 12 to sulphur storage 13. A temperature of about 125°C. is suitable for condensing the elemental sulphur. The gases now contain hydrogen sulphide and sulphur dioxide in approximately a 2:1 molar ratio. The gases freed from sulphur next pass by line 14 to heat exchanger 15 where they are heated by an external source of heat to a temperature in the range 200°C. to 275°C. The heated gases pass by line 16 to reactor 17 which contains one of the catalysts mentioned above. In this reactor the hydrogen sulphide and sulphur dioxide react to form elemental sulphur. The elemental sulphur in gaseous form mixed with residual gases next passes by line 18 to condenser 19. Here the elemental sulphur is condensed and passes by line 20 to sulphur storage 21. A temperature of about 125°C. is suitable for condensing the sulphur. The residual gases pass from condenser 19 by line 22.

The process is additionally illustrated by the following Example.

EXAMPLE

An experimental two stage process equivalent to the first two stages of the invention was set up employing two beds of alumina catalyst (Harshaw activated alumina, AE 1706 E 1/8, extruded as one-eighth inch diameter particles one-eighth one-fourth inch length, surface area about 200 square meters per gram) contained in quartz tubes and heated to approximately 920°C. and 420°C. respectively. Metered flows of methane and sulphur dioxide at an overall molar ratio of 1:2 were admitted to the reactors. The gas lines were devised so that part of the sulphur dioxide could bypass the 920°C. reactor and enter the 420°C. reactor in admixture with the reaction products of the 920°C. reactor. The output from the 420°C. reactor passed through a cooled tared trap in which elemental sulphur condensed. The gases leaving this trap were analyzed for sulphur dioxide and hydrogen sulphide. Reactions were carried out at space velocities of 100 volumes per hour, with sulphur dioxide bypass from 0 to 50 percent by volume. In addition, reactions were carried out at space velocities of 1000 volumes per hour and 50% by volume bypass of sulphur dioxide. Sulphur yield (percentage of sulphur dioxide feed found as elemental sulphur in the trap) and sulphur recovery (elemental sulphur, sulphur dioxide and hydrogen sulphide as percentage of sulphur dioxide feed) were determined. The outlet gas is of the composition suitable for reaction in the third stage of the process of the invention. The results are shown in the following Table.

TABLE

| % Sulphur Dioxide by-passing first stage reactor % by volume | Gas Space Velocity through first stage reactor volumes per hour | Sulphur Yield % by weight | Sulphur Recovered % by weight |
|---|---|---|---|
| 0 | 100 | 67.5 | 96.6 |
| 10 | 100 | 64.3 | 96.6 |
| 20 | 100 | 67.3 | 90.6 |
| 30 | 100 | 72.6 | 96.7 |
| 40 | 100 | 73.8 | 96.4 |
| 50 | 100 | 74.2 | 93.5 |
| 50 | 1000 | 65.0 | — |
| 50 | 1000 | 64.8 | — |
| Theoretical | — | 72.1 | 100.0 |

It can be seen that the yield of 1000 volumes per hour and 50% by pass is approximately the same as the yield obtained at 100 volumes per hour and 0% bypass.

What we claim is:

1. In a process for the reduction of sulphur dioxide with hydrocarbon gas in molar ratio of sulphur dioxide to hydrocarbon calculated as methane of 2:1 employing three reaction stages in the presence of catalyst, wherein during the first stage, at 800°C. to 1000°C., sulphur dioxide is reduced to hydrogen sulphide, carbonyl sulphide and carbon disulphide; in the second stage, at 350°C. to 450°C. and in the presence of a catalyst, sulphur dioxide reacts with the carbonyl sulphide and carbon disulphide to form elemental sulphur; and in the third stage, at 200°C. to 275°C. and in the presence of a catalyst, sulphur dioxide and hydrogen sulphide in 1:2 molar ratio react to form additional elemental sulphur, the improvement which comprises introducing the sulphur dioxide in two separate portions of which the first portion in amount sufficient to provide a mole ratio of sulphur dioxide to hydrocarbon calculated as methane in the range 1.0 to 1.2 is introduced in the first reaction stage, and the second portion in amount sufficient with addition of the first portion to provide a total mole ratio of sulphur dioxide to hydrocarbon calculated as methane of 2.0 is introduced in the second reaction stage.

2. A process as claimed in claim 1 wherein the catalyst is selected from the group consisting of activated alumina, bauxite, calcium sulphide and quartz.

3. A process as claimed in claim 1 wherein the hydrocarbon is natural gas.

4. A process as claimed in claim 1 wherein the hydrocarbon is selected from the group consisting of methane, ethane, propane, butane, pentane, hexane and mixtures of the same.

* * * * *